May 14, 1940.                C. DEDLOW                 2,200,982
                    METHOD FOR CRYSTALLIZING FATS
                      Filed Aug. 30, 1937          2 Sheets-Sheet 1

Carl Dedlow
INVENTOR

ATTEST—
Wm. C. Meiser

BY
ATTORNEY

May 14, 1940.   C. DEDLOW   2,200,982
METHOD FOR CRYSTALLIZING FATS
Filed Aug. 30, 1937   2 Sheets-Sheet 2
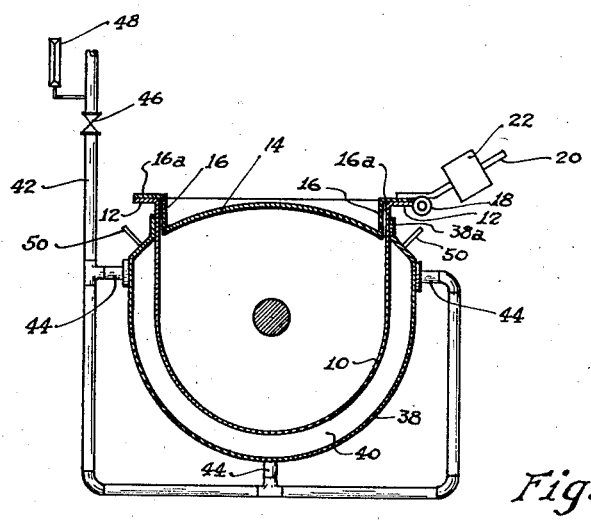
Fig. 2
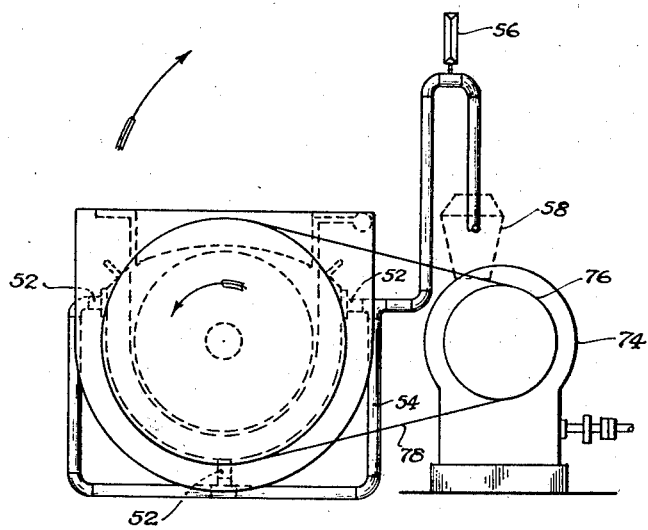
Fig. 3
Carl Dedlow
INVENTOR
ATTEST-
BY 
ATTORNEY Patented May 14, 1940

2,200,982

UNITED STATES PATENT OFFICE 2,200,982

METHOD FOR CRYSTALLIZING FATS

Carl Dedlow, La Plata, Argentina, assignor to Swift & Company, Chicago, Ill., a corporation of Illinois Application August 30, 1937, Serial No. 161,545
In Argentina March 24, 1937

2 Claims. (Cl. 62—170)

This invention relates to the purification of fats and oils.

One of the objects of the invention is to provide an improved method of purifying fats and oils.

Another object of the invention is to provide an improved method of removing from fats and oils, components having a higher melting point than the fat or oil.

Other objects of the invention will be apparent from the description and claims which follow.

The drawings exemplify one form of apparatus which may be employed in practicing the method of the present invention.

Figure 2 is a section on the line 2—2 of Figure 1.

Figure 3 is an elevation of the rear end of the upper container.

Figure 1:
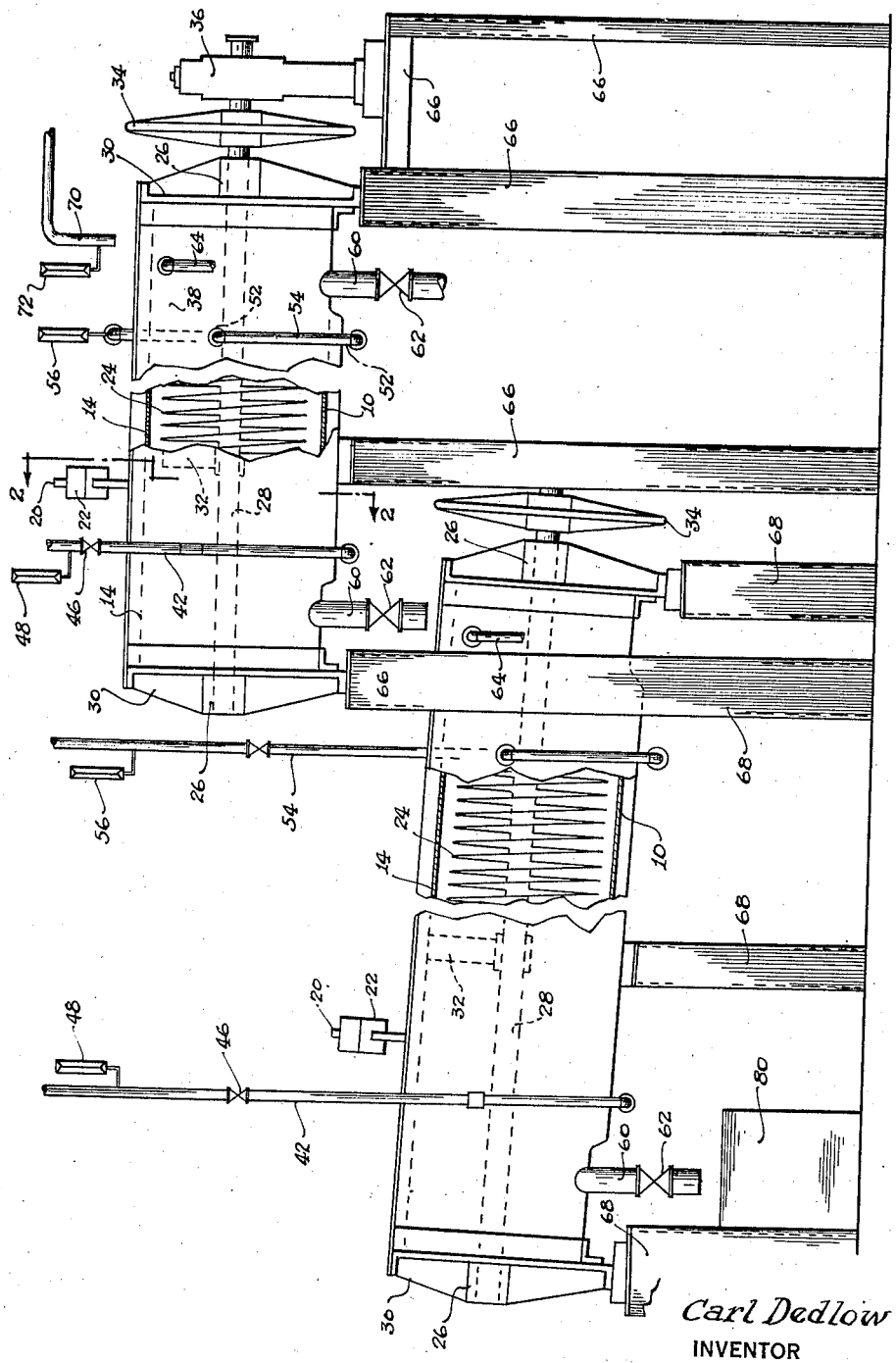
Figure 1 is a side view of the machine.

The device illustrated in the drawings comprises two similar units 10, the first unit 10 being disposed above and to one end of the second unit 10. It is deemed necessary to describe but one unit 10.

As shown in Figure 2, unit 10 is U-shaped in cross section and is provided with outwardly flanged edges 12. Cover 14 is dished throughout its length and at its longitudinal edge 16 is bent first upwardly and then outwardly thus forming margins 16a adapted to fit on margins 12. Cover 14 is hingedly mounted as at 18 and is provided with a lever 20 which carries counterweight 22 to facilitate its opening.

Screw conveyor 24 mounted on shaft 28 extends longitudinally of unit 10, the shaft 28 being journaled in bearings 26 formed within ends 30 of unit 10. Shaft 28 also is journaled through an auxiliary bearing 32 mounted substantially midway between ends 30 of unit 10. Bearing 32 preferably is made of hard wood and is lubricated with the treated oil or fat to avoid contamination either by a mineral oil or by metal particles. Conveyor 24 is fitted closely between the inner walled area of unit 10 and cover 14 to avoid the accumulation of cooled material against the inner walls of unit 10 and cover 14. This arrangement is found to be especially important in the second unit 10 because of the greater stiffness of the treated oil or fat therein.

Shaft 28 at one of its ends is extended exteriorly of unit 10 and is exteriorly rotatably driven through the medium of drive wheel 34 pinioned or otherwise rigidly secured thereon. Shaft 28 at its end extended exteriorly of unit 10 also is journaled through bearing 36.

The outside of unit 10 is partly covered by jacket 38 so positioned that there remains a space 40 between the jacket 38 and unit 10. The longitudinal edges 38a of jacket 38 are curved inwardly and are fixedly secured to unit 10, and likewise, jacket 38 at its end edges is fixedly secured to unit 10 so that the space between the jacket 38 and unit 10 is completely closed.

The space 40 is in communication with a source of refrigerating material, for example, water for the first unit 10 and brine for the second unit 10, through a conduit 42 located near the end of unit 10 and remote from drive wheel 34. Conduit 42, it will be seen, is provided with a plurality of branches 44 which discharge into space 40 and which are designed to secure uniform distribution of the refrigerating liquids through space 40. Conduit 42 is further provided with valve 46 and thermometer 48. To avoid air locks, release valve 50 is provided in the uppermost part of space 40. The refrigerating liquids are circulated through spaces 40 in a direction counter to the direction of movement of the treated material. The refrigerating liquids are passed from spaces 40 through outlets 52, conduits 54 and discharge pipes 58. Each of the conduits 54 is provided with a thermometer 56.

Unit 10 is further provided in the bottom part thereof with a discharge opening 60, provided with valve 62, and at a higher level with a discharge orifice 64. The first unit 10 is carried by a frame 66 which supports it in a substantially horizontal position. The second unit 10 is carried by a corresponding frame 68. The second unit 10 is longitudinally supported at a angle, the lower end thereof being located below the first unit 10 in such wise that the discharge opening 60 of the first unit 10 is above the inlet opening of the second unit 10. Both of the units 10 are externally covered with a layer of heat insulating material of sufficient thickness.

Conveyor 24 is driven from a source of power coupled to a gear box 74 which is provided with a pulley 76 coupled to drive wheel 34 by means of belt 78 or the like.

In practicing the method of the present invention, the preheated fat arrives through conduit 70 and falls, at a temperature of approximately 120° F., into the interior of the first unit 10 where the temperature is reduced to approximately 100° F. In the first unit 10 the screw conveyor carries the fat continuously forwardly and delivers it finally through opening 60 into the second unit 10, into which it enters at a temperature of approximately 100° F., cooling down to approximately 92° F.

The fat on passing through the first unit 10 is cooled and by this cooling of the fat the components having the highest melting points, that is to say, stearin, palmitin and the like, commence to crystallize forming crystals of various sizes. These crystals, on being transferred to the second unit 10, increase in volume by reason of the second refrigeration to which they are subjected. The chilled fat passing from the second unit 10 falls into tank 80 from which it is taken as by dipping or other suitable manner, to presses for filtering. The chilled fat may be filtered through canvas of eight ounces, or its equivalent.

The method herein disclosed has the advantage that the crystals grow to a size sufficiently large to enable them to be retained by the filtering cloths, thus allowing of the separation of the unsolidified part of the fats. Such treatment allows the volume of the crystals to be increased to a predetermined size and moreover prevents the crystals from growing together, so that the separation of the oleo from the stearin can be carried out with the greatest possible ease.

The apparatus may be run continuously or intermittently. In the latter case, the first unit 10 is completely filled with hot fat which is cooled by the action of cold water until it reaches a temperature at which it may be suitably transferred to the second unit 10, and the crystallization is completed in the second unit 10 while the first unit 10 is being refilled. In the former case, the fat is allowed to reach the first unit in a continuous stream and pass continuously through the second unit to the outlet where it arrives ready for pressing.

I claim:

1. The method of treating oil to remove therefrom the components having a melting point higher than the oil which comprises quickly chilling the oil to a temperature sufficient to form seed crystals of the components having the higher melting point, quickly chilling the chilled oil to a lower temperature sufficient to cause the seed crystals to increase by accretion and to solidify substantially all of the components having the higher melting point and thereafter separating the crystals from the oil.

2. The method of treating oil to remove therefrom the components having a melting point higher than the oil which comprises heating the oil to a temperature above the melting point of the components having the higher melting point, quickly chilling the oil to a temperature below the melting point of the components having the higher melting point to form seed crystals of the components having the higher melting point, quickly chilling the chilled oil to a lower temperature sufficient to cause the seed crystals to increase by accretion and to solidify substantially all of the components having the higher melting point and thereafter separating the crystals from the oil.

CARL DEDLOW.